United States Patent Office 3,729,507
Patented Apr. 24, 1973

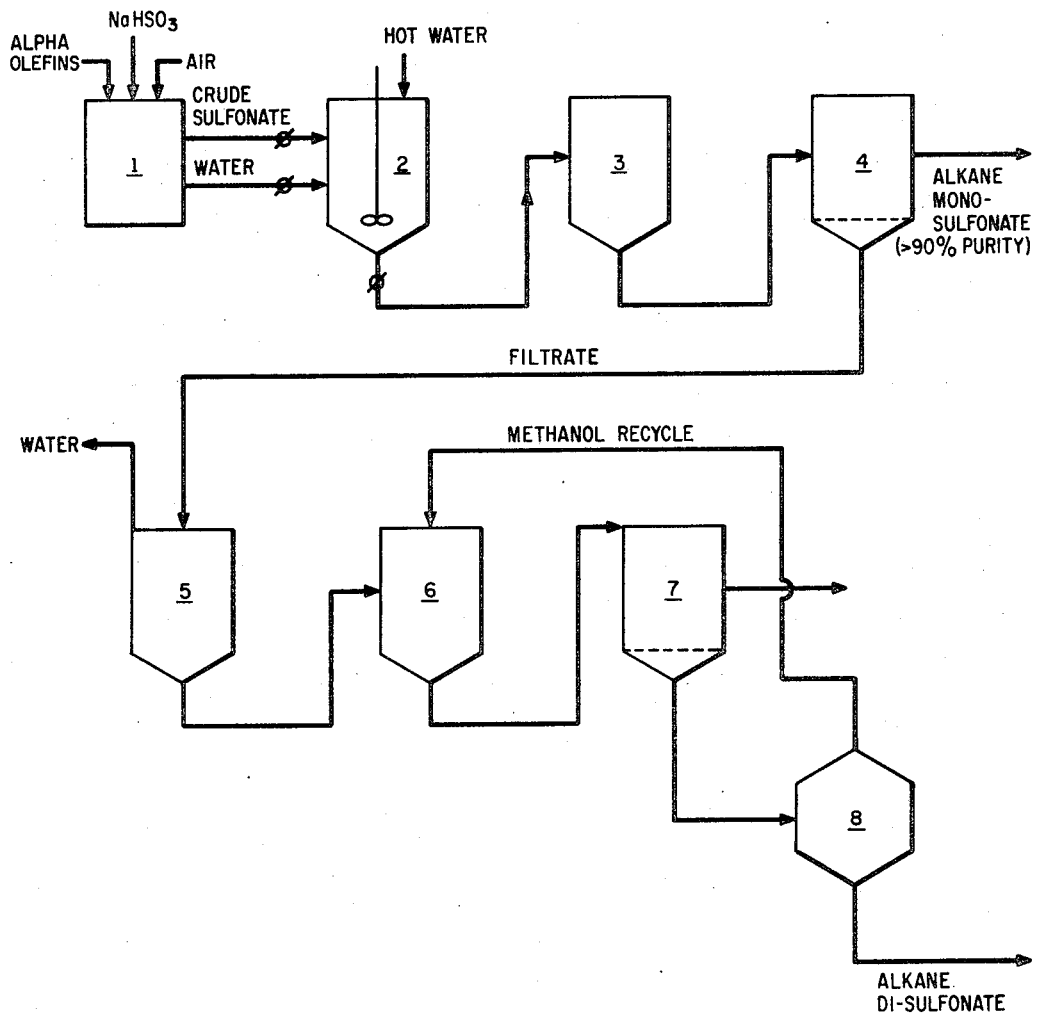

3,729,507
PURIFICATION OF ALKANE SULFONATE PRODUCTS
Phillip M. Beazley, Littleton, and Charles J. Norton, Denver, Colo., assignors to Marathon Oil Company, Findlay, Ohio
Filed Aug. 10, 1970, Ser. No. 62,462
Int. Cl. C07c *143/02, 143/04*
U.S. Cl. 260—513 B                                    9 Claims

ABSTRACT OF THE DISCLOSURE

Alkane sulfonate mixtures are separated and purified by dissolving crude sulfonate mixture in hot water, heating to 30–300° C., filtering as necessary, crystallizing to form alkane mono-sulfonate of greater than 90% purity from one crystallization. Disulfonate is recovered by concentrating the filtrate to dryness and subsequent separation from inorganic salts by solution in hot methanol.

CROSS-REFERENCE TO RELATED APPLICATIONS

U.S. patent application Ser. No. 520,632 filed Jan. 14, 1966, now U.S. Pat. 3,522,297, Ser. No. 579,561 filed Sept. 15, 1966, now U.S. Pat. 3,549,708, Ser No. 710,777 filed Mar. 6, 1968, now U.S. Pat. 3,622,517, Ser No. 763,929 filed Sept. 30, 1968, now U.S. Pat. 3,579,546, generally relate to the reaction of metal bisulfites with unsaturated hydrocarbons to cause bisulfite addition to the hydrocarbons. U.S. patent application Ser. No. 38,274 filed May 18, 1970, pending, discloses methods for varying the mono-sulfonate-to-disulfonate ratio in the product mixture produced from such reactions.

BACKGROUND OF THE INVENTION

(1) Field of the invention

The present invention relates to the chemistry of carbon compounds, radical-acid function-containing sulfur, acyclic generally classified in Class 260 Subclass 513 of the United States Patent Office.

(2) Description of the prior art

Various patents have taught bisulfite addition to unsaturated hydrocarbons including U.S. 3,450,749 which also teaches an extraction process for removal of alkali metal bisulfites from reaction mixtures thus produced; U.S. 3,306,931, U.S. 3,332,874, and U.S. 2,787,639 which claim 1,2-disodium alkane sulfonates and alkane 1,2-disulfonic acids. Various other patents of possible interest may be found in the following subclasses of the United States Patent Office: 260–513, 252–121 and 252–137. The last named patent involves brominating alpha-olefins to form the dibromide and then adding anhydrous sodium sulfite. None of the remaining patents teach the presence of mono- and disodium alkane sulfonates in their reaction mixtures. Particularly, none of the patents provides the simple techniques of the present invention for the separation of mono- and disulfonates from crude product mixtures.

SUMMARY

(1) General statement of the invention

According to the present invention, alkane sulfonate mixtures are prepared by bisulfite addition to alkenes and the mono- and disulfonates are separated from the resulting crude product mixtures by dissolving the product mixtures in hot water, heating to from about 30 to about 300° C., more preferably from about 50 to 200, and most preferably from about 60 to 100° C., filtering, centrifuging or otherwise physically separating the precipitate after crystallizing. The alkane mono-sulfonate crystallized can be of greater than 90% purity when using only a single crystallization. The disulfonate can then be recovered by concentrating the filtrate to dryness and separating the inorganic salts, e.g., by dissolving the disulfonate in hot alcohol, preferably methanol.

Therefore, the present invention preserves the inherent simplicity of the bisulfite addition to alkenes, permitting the well-developed techniques of that reaction to be applied. Recognizing the inherently different physical properties and corresponding commercial applications of mono- as compared to disulfonates, the present invention then economically separates the mono- from the disulfonates. The invention thus provides an overall process for the formation of specialized high-performance surfactants which process is both simple and economical.

(2) Utility of the invention

The mono-sulfonates of the present invention are well suited to the preparation of bar-from surfactants, e.g., for toilet use. The alkane disulfonates exhibit very high solubility causing them to be particularly useful in the formulation of liquid detergents having good shelf life and appearance. Conversely, the limited solubility of the alkane mono-sulfonates can detract from the quality of liquid detergents while the disulfonates tend to cause detergent bars to be brittle and susceptible to cracking. By recognizing these differences in applicability and separating the two types of detergents, the present invention permits each of the types of detergents to be applied to the application to which it is best suited.

BRIEF DESCRIPTION OF THE DRAWING

The drawing is a schematic representation of a preferred embodiment of the present invention.

DESCRIPTION OF THE PREFERRED EMBODIMENTS

(1) Starting materials

The hydrocarbon starting materials for the present invention are olefins having from 6 to about 24, more preferably from about 10 to about 20 carbon atoms. Most preferably, product mixtures intended primarily for liquid detergent shampoo applications will preferably have from about 12 to about 14 carbon atoms, while those intended for liquid household detergents will have about 14 to about 20, and product mixtures intended for bar detergent applications will preferably have from about 14 to about 18 carbon atoms. The olefins are most preferably straight-chain olefins, but up to about 25, more preferably 10, and most preferably less than 5 mole percent branch-chained olefins may be included in the starting materials. The olefins are preferably terminal or alpha-olefins, although internal olefins can be employed. Also, the olefins are preferably monoolens, although minor amounts of diolefins can be contained in the starting hydrocarbons.

The source of the bisulfite ion can be chosen from the group consisting of alkali metal bisulfites and ammonium bisulfites. If desired, the bisulfite can be produced in situ by contacting gaseous sulfur dioxide with the reaction mixture containing an alkali metal hydroxide or ammonium hydroxide. Preferably from about 0.5 to about 5 moles of bisulfite are utilized per mole of olefin. Optimum results are generally with from about 1.0 to about 2.5 moles of bisulfite per mole of olefin.

The bisulfite addition reaction is preferably conducted in the presence of an organic solvent. The solvent can be selected from the group consisting of monohydric alcohols, glycols, and amino alcohols having from 1 to about 5 carbon atoms. Monohydric alcohols are particularly preferred. Optimum results are generally obtained with straight-chain alcohols, but for economic reasons, branch-chain alcohols may be utilized. Preferably, the weight ratio of alcohol to olefin is from about 0.3 to about 2.8, more preferably from 0.6 to 2.0, and most preferably from 0.8 to 1.5.

The reaction is conducted in the presence of water which is a solvent for the inorganic bisulfite. Preferably, the weight ratio of water to olefin is from 0.5 to 3.5, more preferably from 0.7 to about 2.8, and most preferably from about 0.9 to about 2.4.

The bisulfite addition reaction is preferably conducted in the presence of gaseous elemental oxygen. Any oxygen-containing gas can be used as a source of oxygen, provided that it has at least about 2% by volume of $O_2$ and does not contain interfering components. Air is the preferred source of oxygen.

While, in some instances other solvents, e.g., other alkanols, such as ethanol, isopropanol, dipolar aprotic solvents such as dialkyl formamides, N-alkyl pyrrolidones, amino alcohols can be used for extracting the organic disulfonate from the inorganic salts, methanol is the most preferred. The solvents should preferably not contain above about 5% by weight water.

Where desired, the techniques of the aforementioned prior art and copending applications can be employed with the present invention.

(2) Catalyst

While not necessary to the practice of the present invention, oxidation catalysts including hydroperoxides and other catalysts taught by bisulfite addition in the prior art, may be employed with the present invention.

(3) Temperature

The temperature during the bisulfite addition is not narrowly critical and may range from 20 to about 200, more preferably 60 to about 150, and most preferably 80 to about 100° C.

The temperature during the step of dissolving the product mixture in water is also not narrowly critical and may range from about 20 to about 300, more preferably 50 to about 150, and most preferably 90 to about 110° C.

During the crystallization step, the temperature will generally be relatively carefully controlled. While the optimum temperature for crystallization will vary with the specific starting materials being employed, temperatures of from 10 to about 60, more preferably 15 to about 50, and most preferably 20 to about 30° C. are preferred.

Optimum temperatures for each of the stages can be readily determined by routine trial runs.

(4) Pressure

Pressure is not narrowly critical and while pressures of from about 0.1 to 10,000 atmospheres can be employed, it will be preferable in most instances to conduct each of the steps of the present invention at approximately ambient pressures.

(5) Time

Contact time for the bisulfite addition reaction will preferably be approximately 0.1 to about 10, more preferably 0.2 to about 5, and most preferably 0.5 to about 2 hours. This time will be readily optimized on the basis of the particular starting materials being employed.

(6) Batch or continuous operation

While the invention is described on a batch basis, it may, of course, be practiced on a continuous basis with continuous flows of starting materials into the reactor.

EXAMPLE I 1.0 mole per hour of $C_{15}$ through $C_{18}$ alpha olefins (see Table 1 composition) 1.1 moles per hour of sodium bisulfite, and 0.15 mole per hour of oxygen in the form of air are added to reactor 1 which is agitated with a high-speed stirrer. After a reaction period of approximately 2 hours at 70° C., the product mixture consists of two phases, a crude sulfonate phase and a water phase, both of which are transferred to a dissolving vessel 2 to which is added approximately 5 liters per mole of sulfonate of water having a temperature of 80 to 100° C. After stirring the water-product mixture thoroughly, the resulting mixture is then sent to crystallizer 3 operated at a temperature of approximately 20° C., where crystals form and gradually drop to the bottom to be removed as a slurry which is then filtered. The product mixture contains 46% by weight monosulfonate, 40% disulfonate, 10.1% salt, (mostly sodium sulfate) 2.4 oil (unreacted hydrocarbon) and 1.3% water.

TABLE 1

Test Report: Chevron $C_{15}$–$C_{18}$ Alpha-Olefins

| Property: | Value |
|---|---|
| Condition at 70° F.: Bright and clear, no sediment. | |
| Color, Saybolt | −1 |
| Paraffin content _____wt. percent__ | 1.4 |
| Bromine No. _____g./kg__ | 73 |
| Diolefin content _____wt. percent__ | 4.7 |
| Straight-chain content _____do____ | 92.6 |
| Alpha-olefin content _____do____ | 90.5 |
| Peroxide content _____meq./l__ | 0.8 |
| Carbon distribution: | |
| $C_{14}$ _____wt. percent__ | 1.7 |
| $C_{15}$ _____do____ | 26.6 |
| $C_{16}$ _____do____ | 29.1 |
| $C_{17}$ _____do____ | 27.8 |
| $C_{18}$ _____do____ | 14.8 |
| $C_{19}$ _____ | None |
| Average molecular weight _____ | 228 |

EXAMPLE II

The resulting product mixture is then filtered in filter 4 which recovers a solid phase consisting of alkane monosulfonate of better than 90% purity. The filtrate from filter 4 is then sent to dryer 5 where water is removed to recover a slurry of alkane disulfonate plus impurities, primarily inorganic salts. In alcohol solution vessel 6, this slurry is treated with methanol in amounts of about 20 pounds of methanol per pound of alkane disulfonate at a temperature of 50–60° C. The resulting mixture is then refiltered in filter 7 which removes the solid phase consisting of substantially all the inorganic salts and impurities which are sent to waste. The filtrate from filter 7 is sent to an alcohol recovery dryer 8 which recovers the methanol to recycle to alcohol solution vessel 6 and produces a substantially dry alkane di-sulfonate having a product purity of better than about 90%. Table 2 shows the composition of both the di- and the mono-sulfonate products.

TABLE 2

Analyses of Product Fractions

| Sample | Percent | | | |
|---|---|---|---|---|
| | Activity | Oil | Salt | Water |
| Mono-sulfonate | 100 | 0 | 0 | a] |
| Di-sulfonate | 100 | 0 | Trace | a0 | a Not analyzed for water. Dried in vacuum oven at 100° C.

EXAMPLE III

When the mono-sulfonate product produced in Example I is used in an attempt to form a liquid detergent, its solubility in water at 100° C. is found to be only approximately 0.5 q./100 g. of water causing precipitation when more concentrated solutions are attempted. Table 3 gives foam height and stability, Table 4 gives solubility and Table 5 gives detergency comparisons of the mono-versus and the di-sulfonate products of Tables 2–4.

TABLE 3

Foam Height and Stability (Graduated Marks on 100 ml. Cylinder)

| Sample | Detergent solution concentration, wt. percent | | | | | |
|---|---|---|---|---|---|---|
| | 0.05 | | 0.10 | | 0.15 | |
| | Initial | 5 min. | Initial | 5 min. | Initial | 5 min. |
| Monosulfonate | 42 | 14 | 44 | 17 | 51 | 22 |
| Disulfonate | 78 | 55 | 108 | 85 | 115 | 93 |
| Mixture before fractionation | 56 | 28 | 56 | 34 | 81 | 62 |

TABLE 4

Detergent Solubility in Distilled Water [1]
(Grams/100 ml.)

| Sample | 60° F. | 70° F. | 80° F. | 100° F. | 110° F. | 120° F. |
|---|---|---|---|---|---|---|
| Monosulfonate | 0.01 | 0.01 | 0.02 | 0.02 | 0.02 | 0.02 |
| Disulfonate | 8.4 | 9.0 | 9.9 | 13.5 | 38.7 | 40.3 |
| Mixture before fractionation | 0.01 | 0.01 | 7.6 | 11.4 | 38.1 | 39.7 |

[1] Reference for solubility test: J. Am. Chem. Soc. 61, 539-44 (1939).

TABLE 5

| Detergency | | Percent reflectance | | |
|---|---|---|---|---|
| Fraction | Hardness (p.p.m.) | 1 g./l. | 2 g./l. | 3 g./l. |
| Monosulfonate | 50 | 12.05 | 18.00 | 20.20 |
| Disulfonate | 50 | 7.35 | 10.25 | 14.60 |
| Monosulfonate | 150 | 10.60 | 14.65 | 18.20 |
| Disulfonate | 150 | 7.80 | 11.30 | 14.15 |

EXAMPLE IV

When the alkane mono-sulfonate produced in Example I is combined with other conventional bar detergent ingredients, it makes a bar of good strength and resistance to cracking and exhibits excellent detergency characteristics.

EXAMPLE V

When the di-sulfonate product produced in Example I is attempted to be formulated with conventional detergent ingredients to a detergent bar, the bar is found to be readily broken and to be susceptible to cracking.

EXAMPLE VI

When the hexadecene di-sulfonate produced in Example I is formulated into a liquid detergent, its solubility in water is found to be greater than 100 grams per liter at 100° C., permitting the production of a stable, non-precipitating concentrated solution having excellent detergency properties.

(7) Modifications of the invention

It should be understood that the invention is capable of a variety of modifications and variations which will be made apparent to those skilled in the art by a reading of the specification and which are to be included within the spirit of the claims appended hereto. For example, where filters are shown, it is obvious that they can be readily replaced by continuous or batch-type centrifuges. For certain commercial operations it is not necessary to remove the inorganic salts from the di-sulfonate solution after the removal of the alkane mono-sulfonates. Instead, the di-sulfonate solution can be used directly as a crude liquid detergent formulation of special economy.

What is claimed is:

1. In a process for the preparation of alkane sulfonates suitable for the preparation of detergent bars, by reaction of alkali metal bisulfites or ammonium bisulfites with hydrocarbon olefins having about 6 to about 24 carbon atoms, to form a product mixture, adding water to achieve a weight ratio of water to olefin in the range of from about 0.5 to about 3.5, as necessary to dissolve said product mixture, the improvement consisting essentially of heating to from about 20 to about 300° C., and thereafter lowering the temperature to the range of from about 10 to about 60° C. to crystallize out substantially pure alkane mono-sulfonate.

2. A process according to claim 1 wherein the solution remaining after crystallization of said alkane monosulfonates is utilized in the preparation of water-based liquid surfactants.

3. A process according to claim 2 comprising an additional step wherein said alkane disulfonates are separated from inorganic salts by dissolving said alkane di-sulfonates in organic solvent, selected from the group consisting of monohydric alcohols.

4. A process according to claim 1 wherein the sulfonates are produced from alpha olefins.

5. A process according to claim 2 wherein the sulfonates are produced from alpha olefins.

6. A process according to claim 3 wherein the sulfonates are produced from alpha olefins.

7. A process according to claim 3 wherein the organic solvent is methanol.

8. A process according to claim 1 wherein the weight ratio of water to olefins is from about 0.7 to about 2.8 and wherein the product mixture is heated to from about 50 to 150° C.

9. A process according to claim 4 wherein the weight ratio of water to olefins is from about 0.5 to about 3.5 and wherein the organic solvent comprises methanol.

References Cited

UNITED STATES PATENTS 2,727,057    12/1955    Park _____ 260—513 B
2,061,620    11/1936    Downing et al. ____ 260—513 R DANIEL D. HORWITZ, Primary Examiner

UNITED STATES PATENT OFFICE
CERTIFICATE OF CORRECTION

Patent No. 3,729,507     Dated April 24, 1973

Inventor(s) P. M. Beazley et al

It is certified that error appears in the above-identified patent and that said Letters Patent are hereby corrected as shown below:

Col. 1, line 15:  Delete "30-300°C." and insert therefor --20-300°C.--.

Signed and sealed this 12th day of November 1974.

(SEAL)
Attest:

McCOY M. GIBSON JR.
Attesting Officer

C. MARSHALL DANN
Commissioner of Patents